No. 849,793. PATENTED APR. 9, 1907.
C. A. JUENGST.
METAL SAWING MACHINE.
APPLICATION FILED MAR. 29, 1904.
4 SHEETS—SHEET 3.
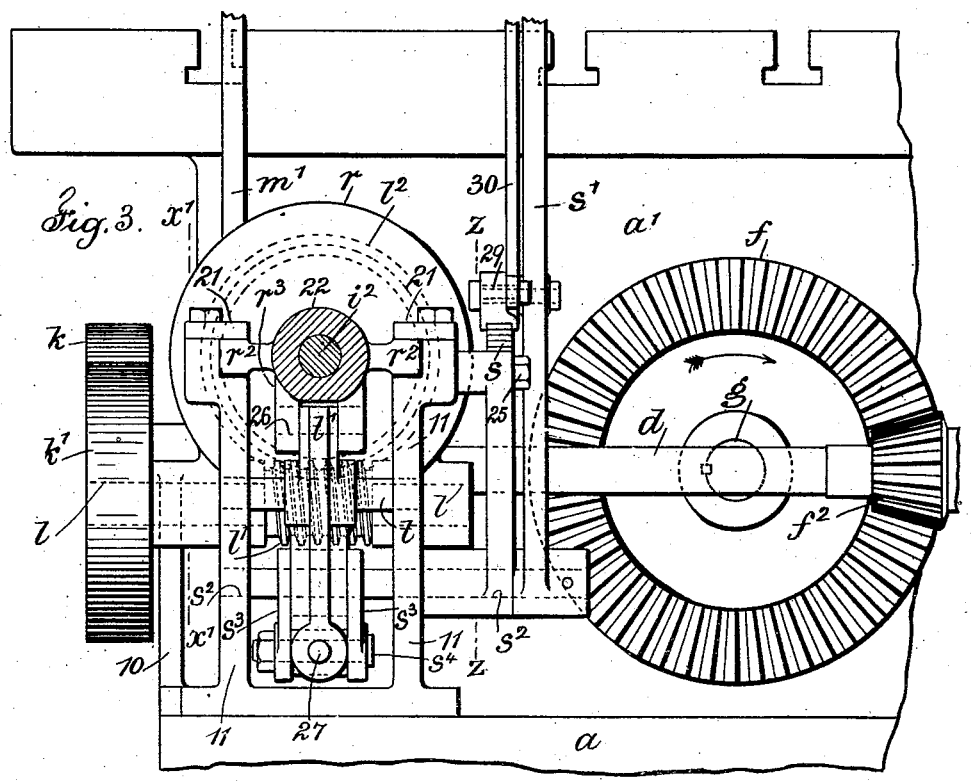
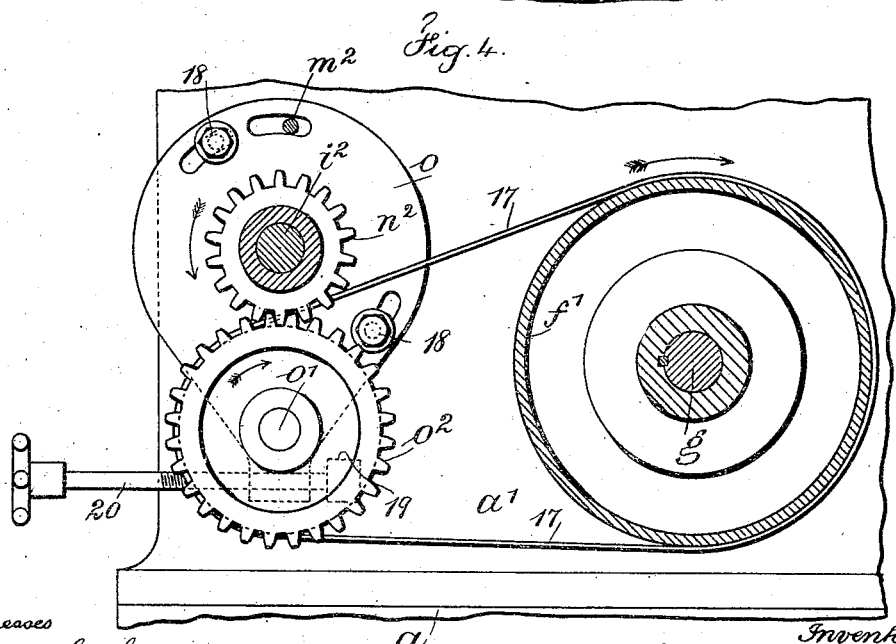

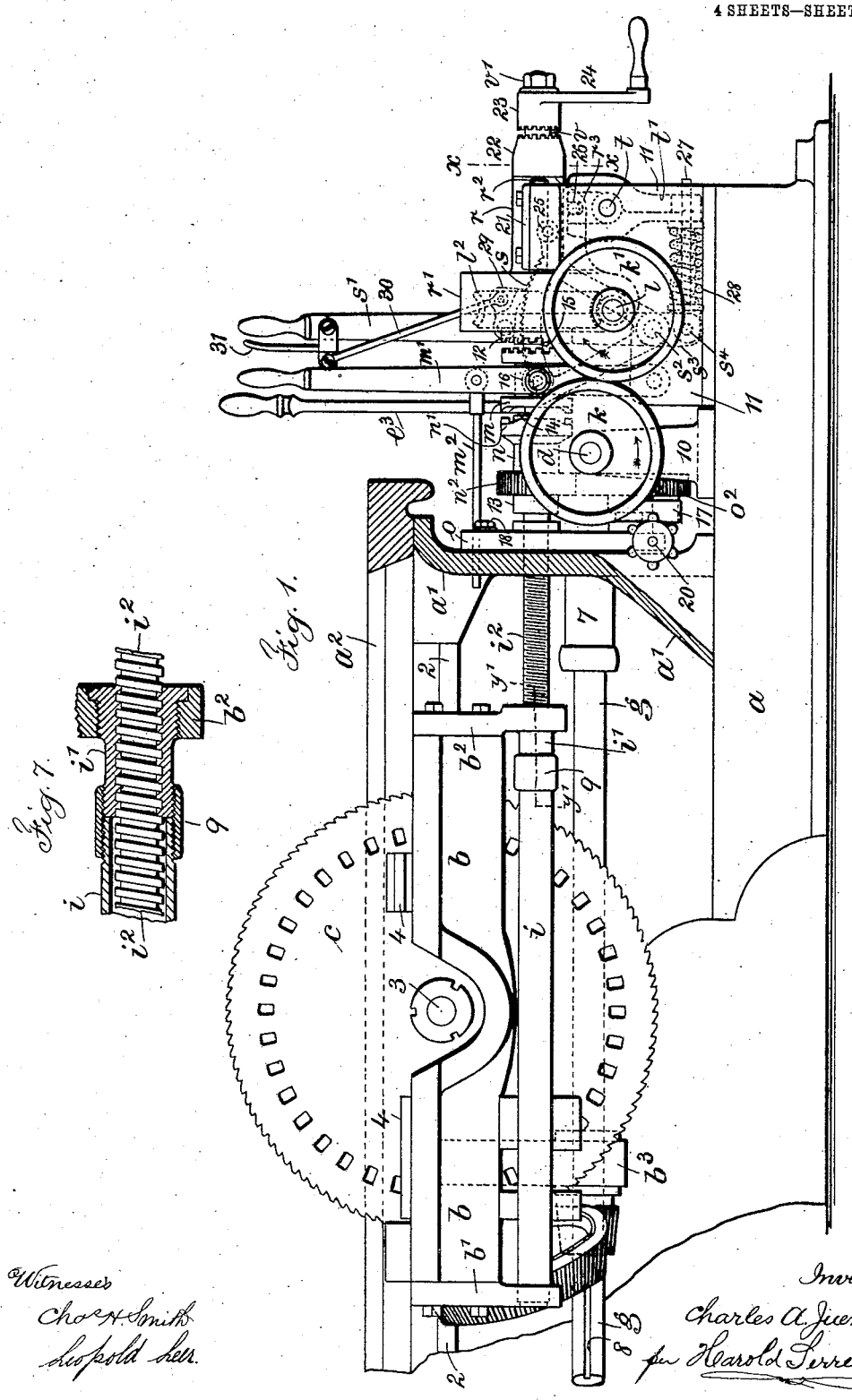

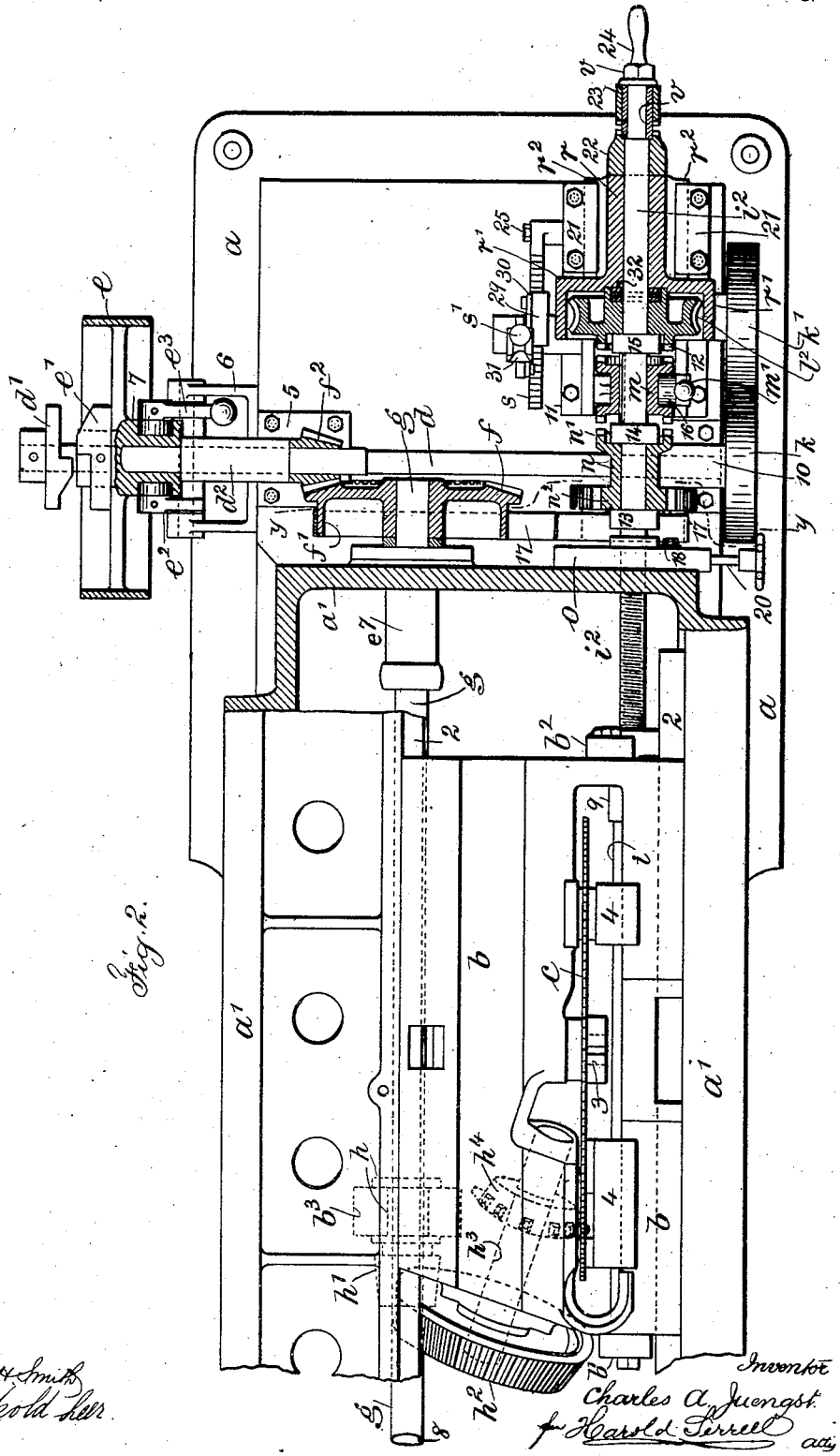

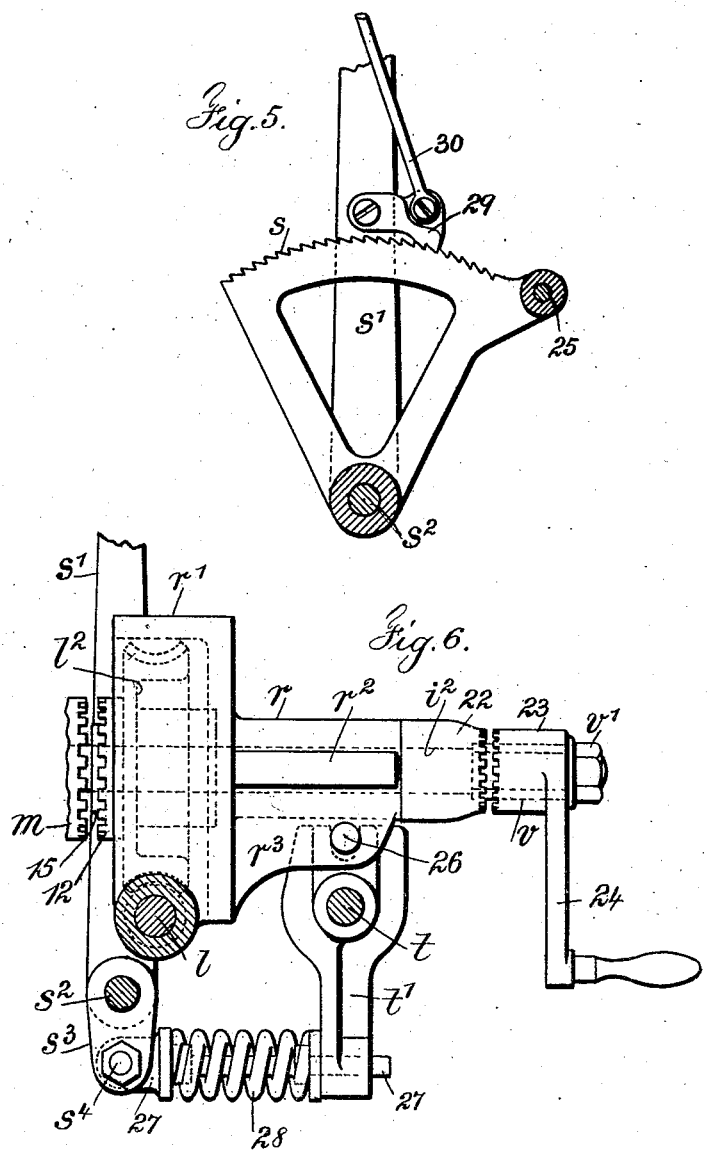

UNITED STATES PATENT OFFICE.

CHARLES A. JUENGST, OF CROTON FALLS, NEW YORK, ASSIGNOR TO HIGLEY MACHINE COMPANY, OF CROTON FALLS, NEW YORK, A CORPORATION OF NEW YORK.

METAL-SAWING MACHINE.

No. 849,793.     Specification of Letters Patent.     Patented April 9, 1907.

Application filed March 29, 1904. Serial No. 200,509.

*To all whom it may concern:*

Be it known that I, CHARLES A. JUENGST, a citizen of the United States, residing at Croton Falls, in the county of Westchester and State of New York, have invented an Improvement in Metal - Sawing Machines, of which the following is a specification.

My invention relates to a machine for sawing articles of metal, especially in a cold state; and the essential object of my present invention is the provision of automatically-operating devices yielding for the disconnection of the feeding devices under excessive load.

In carrying out my invention the saw is mounted on a carriage and means are provided both for revolving the saw and for progressively feeding the saw and carriage along with the progress of the work, the work being mounted upon a table in and along which the saw and carriage are moved. Means are provided which when moved in one direction connect a screw feeding-shaft and a coacting set of revoluble parts with a continuously-revoluble wheel for feeding the saw and carriage forward and which means when moved in the opposite direction connect the screw feeding-shaft with another and different set of parts continuously revoluble for feeding the saw and carriage in a reverse or backward direction for retracting the saw from the work, and other and suitable devices are provided which are manually actuated for applying a graduated tension to devices adapted to yield under excessive load for the disconnection of the feeding devices for momentarily retarding or stopping the movement of the machine.

In the drawings, Figure 1 is a side elevation and partial section representing the devices of my improved machine. Fig. 2 is a plan and partial section of the same without the table. Fig. 3 is an end elevation and section at the dotted line $x\ x$ of Fig. 1. Fig. 4 is an elevation and section at the dotted line $y\ y$ of Fig. 2. Fig. 5 is an elevation and section at the dotted line $z\ z$ of Fig. 3, and Fig. 6 is an elevation and section at the dotted line $x'\ x'$ of Fig. 3. Fig. 7 is a section at the dotted line $y'\ y'$ of Fig. 1. Figs. 3, 4, 5, 6, and 7 show the parts in larger size than in the other figures.

The bed $a$, frame $a'$, and table $a^2$ are preferably of cast metal of sufficient dimensions and strength to support the various operative parts hereinafter described. The table has an opening for placing the saw, and the frame $a'$ is provided with slideways 2 for a carriage composed of a body $b$, brackets $b'\ b^2$, a depending bracket $b^3$, an arbor 3 for the saw $c$, and guides 4 4, secured to the carriage and bearing at points of the saw opposite to the arbor and one of which is adjacent to the place where the power is applied to rotate the same. The carriage rests upon the slideways 2 and is movable thereon.

A shaft $d$ extends transversely of the bed $a$ outside the frame $a'$. It is carried at one end upon a standard 5, having a bearing-sleeve $d^2$, and at the other end upon the standard 10.

$d'$ is a fixed clutch at the outer end of the shaft $d$, and $e$ a pulley for the power-belt loose upon the shaft and having a hub 7, which is provided with a clutch $e'$, adapted to engage the clutch $d'$, and said hub is also provided with a lever device $e^2$, pivoted at one end to a bracket 6, secured to one side of the frame or bed and having rollers engaging a circumferential groove of the hub 7. A handle $e^3$ forms a prolongation of the lever device $e^2$, and when the same is grasped and moved with the lever device acting upon the hub of the pulley $e$ the same is moved with its clutch toward the clutch $d'$, fixed upon the shaft $d$, and when said clutches engage the rotary movement and power of the pulley $e$ is communicated to the shaft $d$.

A shaft $g$ runs at right angles and in the same plane to the shaft $d$ through and lengthwise of the frame $a$ of the sawing-machine. This shaft $g$ at one end is provided with a bearing-sleeve $e^7$ through the end of the frame, and on the end of the shaft $g$ is a bevel-wheel $f$, with an integral belt-flange $f'$. The bevel-wheel $f$ meshes with the bevel-pinion $f^2$ on the shaft $d$, and by said bevel-pinion and bevel-wheel the rotation and the power of the shaft are communicated to the shaft $g$. The shaft $g$ is provided with a longitudinal groove 8. This shaft passes through the bracket $b^3$, extending downward from the carriage, and around said shaft in said bracket is a sleeve $h$, and upon this sleeve are collars at either side of the bracket $b^3$ and a bevel-pinion $h'$, the sleeve being splined to the shaft $g$, so as to rotate therewith, but travel along the shaft with the bracket $b^3$ and the carriage, which said bracket is a part of.

In suitable bearings in the carriage there is a shaft $h^3$, with a gear $h^2$ on one end thereof meshing with the bevel-pinion $h'$, and toward the other end of said shaft between its bearings is a sprocket $h^4$, the teeth of which are adapted to enter the holes provided in the saw for its rotation. Therefore the rotation and power necessary for the rotation and the work of the saw is communicated from the shaft $d$ through the bevel-pinion $f^2$, bevel-wheel $f$, shaft $g$, sleeve $h$, the bevel-pinion $h'$, the gear $h^2$, the shaft $h^3$, and the sprocket $h^4$, the saw continuously revolving so long as the fixed clutch $b'$ and the movable clutch $e'$ of the pulley $e$ are in engagement. A disengagement of these parts is quickly and readily effected by moving the lever $e^3$ in the opposite direction.

Between the brackets $b'$ $b^2$ of the carriage I provide a sleeve $i$, a nut $i'$, secured in the end $b^2$, the nut and sleeve being connected by a coupling 9. A screw-shaft $i^2$ passes through the nut $i'$ and freely into the sleeve $i$ at one end, and at its other end it passes through the frame $a'$ of the machine and through the sleeve $r$, which sleeve is provided with a housing $r'$ and with opposite side ribs $r^2$, which engage slideways 21 of the standard 11, secured to the bed of the machine.

On the end of the shaft $d$ adjacent to the standard 10 there is a smooth-periphery friction-wheel $k$. This is normally in close proximity to, but not in contact with, a similar wheel $k'$ on a shaft $l$ in bearings forming part of the housing $r'$. The shaft $l$ is provided with a worm $l'$, (see Fig. 3,) which meshes with a worm-wheel $l^2$, loose upon the shaft $i^2$ and located within the housing $r'$ of the sleeve $r$ and provided on its outer face around the shaft $i^2$ with clutch-teeth 12. Upon this shaft $i^2$ are collars 13, 14, and 15 for the purpose of locating several parts and limiting their movement, the collar 15 coming against the outer surface of the worm-wheel $l^2$ within the boundary of the clutch-teeth 12 and acting to hold said worm-wheel $l^2$ against the sleeve $r$, and I have shown and prefer to employ between the juxtaposed faces of the worm-wheel $l^2$ and the sleeve $r$ an antifriction-bearing 32, so that the said worm-wheel may turn freely with reference to the non-turning sleeve.

A clutch $m$ is splined upon the shaft $i^2$ and is provided with engaging teeth at its opposite ends, and a lever $m'$, pivoted to the standard 11, is provided with a roller 16, acting between the toothed flanges of the clutch, so as to move the same in opposite directions at the will of the operator, and this lever $m'$ is preferably provided with a guide-rod $m^2$, (shown in Fig. 1 only,) pivoted thereto, and which guide-rod moves through a friction-bearing in the end of the frame $a'$, so as not only to steady the lever, but to hold it in either of its extreme positions. Loose upon the shaft $i^2$ is a sleeve $n$, on one end of which there are clutch-teeth $n'$, adapted to engage the teeth on one end of the clutch $m$, and on the other end of this sleeve there is a gear-wheel $n^2$. The said sleeve coming between the collars 13 14 of the shaft $i^2$ is fixed in its position.

I employ a stud-plate $o$, through which the screw-shaft $i^2$ passes and upon which shaft the stud-plate is supported. This stud-plate is adapted to swing and is provided with slots and with bolts 18, passing through the stud-plate into the end frame of the machine for adjustably securing the said stud-plate in the position to which it may be moved. On the lower end of this stud-plate $o$ is an arbor $o'$ and on the arbor a gear and belt-flange $o^2$. The belt 17 passes around the belt-flange $f'$ of the bevel-wheel $f$ and around the belt-flange of the gear $o^2$, and this belt is tightened by the swinging movement that can be imparted to the stud-plate $o$ upon the shaft $i^2$, and for the purpose of adjusting this stud-plate and the gear and belt-flange $o^2$, carried by the stud $o'$ thereof, I provide a block 19 upon the frame $a'$ and a screw-stem passing through the lower end of the stud-plate $o$ and bearing against the block 19, there being a hand-wheel on the outer free end of the screw-stem 20 for revolving the same and for thereby moving the stud-plate $o$ when the bolts 18 are loosened. The gear $o^2$ and the gear $n^2$ are in mesh. Therefore the rotation and the power that are continuously applied to the shaft $d$ and from the same to the bevel-pinion $f^2$ and the bevel-wheel $f$ are communicated therefrom by the belt-flange $f'$ of this bevel-wheel, the belt 17, the gear and belt-flange $o^2$ to the gear $n^2$, sleeve $n$, and clutch-teeth $n'$, so that these parts are continuously revolving, the location of the sleeve $n'$, as hereinbefore stated, being fixed between the collars 13 and 14 on the shaft $i^2$.

The extreme outer end of the shaft $i^2$ is offset and is provided with a sleeve $v$, which sets up against the offset shoulder and is of greater thickness than the reduction of the shaft, and on the end of the shaft there is a nut $v'$, holding the sleeve $v$ in position. Surrounding and secured to the shaft $i^2$ near its end is a sleeve 22, which abuts up against the end of the sleeve $v$, this latter sleeve holding the sleeve 22 in position. The sleeve 22 is provided with clutch-teeth on the portion thereof which surrounds the sleeve $v$, and a sleeve 23, also with clutch-teeth, surrounds the sleeve $v$, there being a handle 24 connected with the sleeve 23. In the position Fig. 1 the clutch-teeth of these parts are not in contact; but when in contact it is quite evident that the turning of the handle 24 and sleeve 23 will cause a rotation of the shaft $i^2$, so that the saw and its carriage may be fed along an appreciable distance by hand.

A toothed sector $s$, Figs. 2, 3, and 5, is secured by a connection 25 to the side of the standard 11, and a shaft $s^2$ passes through the lower portion of this toothed sector and through parts of the standard 11. On this shaft and outside of the toothed sector $s$ is a lever $s'$, the hub of which is secured to the shaft $s^2$. Pivoted to the lever $s'$ is a pawl 29, (see Fig. 5,) which engages the teeth of the sector $s$. A rod 30 extends upward of the handle from the pawl 29 and is connected to a hand-latch 31, (see Fig. 1,) the action of which in connection with the handle of the lever is to raise the pawl 29 and disengage the same from the teeth of the sector.

Upon the shaft $s^2$ between the parts of the standard 11 are cranks $s^3$, secured to the shaft $s^2$. A pin $s^4$ passes across through these cranks, and pivotally mounted thereto is a head of a pin 27. A shaft $t$ extends across the standard 11 and is provided with bearings therein, and upon this shaft is pivotally mounted a yoke-rocker $t'$, at its lower end apertured for the passage of the pin 27, and between the lower end of this rocker and the head of the pin 27 and around the pin 27 is a spring 28. A pin 26 passes across through the flanges $r^3$ of the sleeve $r$, and the upper jaw end of the yoke-rocker $t'$ passes between the flanges $r^3$ and at either side of the pin 26.

In the operation of the parts just described it will be noticed that the surfaces of the friction-wheels $k$ $k'$ are in contact and that the lever $s'$ has been moved slightly from a normal position, so as to bring the pawl 29 from its normal proximity to the connection 25 over a portion of the surface of the toothed sector. This movement has been sufficient to bring the surfaces of the wheels $k$ $k'$ normally separated into contact. This movement is produced by the swinging of the lever $s'$, the cranks $s^3$, a movement of the pin 27 and spring 28 toward the yoke-rocker $t'$, a swinging of the yoke-rocker $t'$ on the shaft $t$, and a forward movement thereby of the sleeve $r$, housing $r'$, and the bearings of the shaft $l$, which form a part of the housing $r'$ at opposite sides thereof. After the surfaces of the wheels $k$ $k'$ are brought into actual contact it will be apparent that any further movement of the lever $s'$ toward the left hand of Fig. 5 will be to compress the spring 28 as between the head of the pin 27 and the lower end of the yoke-rocker $t'$. This compression will have the effect through the yoke-rocker $t'$, the sleeve $r$, and housing $r'$ to apply greater pressure of the friction-wheel $k'$ against the friction-wheel $k$, so as to overcome any tendency of the wheels to slip with reference to one another. As this pressure is applied it will be apparent that the pawl 29 is moved farther along over the surface of the sector $s$, engaging other teeth of the same toward the left hand, the pawl performing the function of holding the lever in position and keeping constant the strain applied. To make this movement effectual for the movement longitudinally of the table of the machine, of the saw, and its carriage, it will be essential that the lever $m'$ be moved to the right hand, so as to cause the clutch-teeth of the clutch $m$ to engage the clutch-teeth 12 of the worm-wheel $l^2$ and connect the movement and power applied thus to the worm-wheel $l^2$ for the rotation of the shaft $i^2$, and thereby the longitudinal movement of the carriage and saw. The provision of this increasing tension is to accommodate the devices to the work, because where the work is light a minimum pressure between the surfaces of the wheels $k$ $k'$ is all that is essential to transfer the power; but where the work is heavy and the saw is obliged to cut through a considerable thickness of metal the pressure between the surfaces of the wheels $k$ $k'$ must often be increased to the maximum; but the devices described provide ample latitude between the minimum and maximum of pressure to accommodate the different thicknesses of material, which call for an increased effort on the part of the saw.

To reverse the direction of travel of the saw and its carriage, the lever $m'$, Fig. 1, is moved to the left hand, sliding the clutch $m$ along on the shaft $i^2$ from the engagement of its teeth with the teeth 12 of the worm-wheel $l^2$, adjacent to the collar 15, to an engagement of the clutch-teeth of the clutch $m$ with the clutch-teeth $n'$ against the collar 14, which will then communicate the movement and power applied to the sleeve $n$, its gear-wheel $n^2$, and clutch-teeth $n'$ to the clutch $m$ in the reverse direction to rotate the shaft $i^2$ and move the carriage and saw in a backward direction, or, in other words, toward the right-hand end of the machine and toward the wheels $k$ $k'$, withdrawing the saw from the work.

The action of an attendant in grasping the handle of the lever $s'$ and the hand-latch 31, and thereby raising the pawl 29, permits the lever $s'$ to be swung over toward the right hand to an extreme position, shifting the parts hereinbefore described to a state of rest, where the surfaces of the wheels $k$ $k'$ are appreciably separated, so that while the wheel $k$ may keep on its continuous rotation the wheel $k'$ ceases its movement.

In the group of parts hereinbefore described and their operation there is a possibility of a yielding action under excessive load for the disconnection of the feeding devices for momentarily retarding or stopping the movement of the machine, which is effected in the following manner: Supposing that the thickness of the metal being cut increases to too great an extent for the progressive feed of the saw, the saw will be retarded in its movement and a back pressure exerted against the saw, the carriage, and the feed-screw $i^2$. This movement will be transferred from the collar 15 to the worm-wheel $l^2$, the sleeve $r$, its flanges $r^3$ to move the sleeve, as well as the worm-wheel, with the shaft $i^2$ longitudinally of the machine. This movement of course carries with it the bearings of the friction-wheel $k'$, which, as hereinbefore described, are parts of the housing $r'$ to separate the friction-wheels $k$ $k'$ and stop the progressive feeding movement of the saw. This movement is taken up by the movement of the pin 26, the yoke-rocker $t'$ against the spring 28 compressing the spring in proportion to the longitudinal movement of the parts, and this movement may be quite slight. It may be momentary, and it may be momentarily repeated so as to relieve the pressure from the saw, so that the saw is not injured or destroyed in cutting the metal, and the movements may be repeated until the saw has gradually cut through the extra thickness or extra hardness of the metal and normal relations reëstablished, when the expansive action of the spring 28 will restore the operative condition and contact of the parts to continue the progressive feed.

I claim as my invention—

1. In a metal-sawing machine, the combination with a movable carriage, a saw carried thereby, means for continuously revolving the saw with the movement of the carriage, and a feed device for moving the carriage, of a continuously-revoluble wheel, a series of continuously-revoluble parts, a series of parts adapted to be set in motion, and a means whereby the same may be moved into and out of contact with the continuously-revoluble wheel, and a device coupled to the feed device and adapted to be moved in opposite directions and which when moved in one direction engages the latter series of parts for the forward movement of the saw and its carriage, and which when disengaged therefrom and engaged with the first series of revoluble parts acts to move the saw and its carriage in an opposite or backward direction.

2. In a metal-sawing machine, the combination with a movable carriage, a saw carried thereby, means for continuously revolving the saw with the movement of the carriage, and a feed device for moving the carriage, of a continuously-revoluble wheel, a series of continuously-revoluble parts, a series of parts adapted to be set in motion and a means whereby the same may be moved into and out of contact with the continuously-revoluble wheel, a device coupled to the feed device and adapted to be moved in opposite directions and which when moved in one direction engages the latter series of parts for the forward movement of the saw and its carriage, and which when disengaged therefrom and engaged with the first series of revoluble parts acts to move the saw and its carriage in an opposite or backward direction, and means for manually applying a graduated tension to the second series of revoluble devices in proportion to the work required of the saw.

3. In a metal-sawing machine, the combination with a saw, a carriage, means for continuously revolving the saw during the movement of the carriage and a feed device for moving the carriage, of a friction-wheel and means for continuously revolving said wheel with the parts rotating the saw, a second and similar friction-wheel normally in close proximity to the continuously-revoluble wheel, said wheels arranged to have their perimeters engage, a shaft on which said second wheel is mounted, a worm upon said shaft, devices coacting therewith for effecting the movement of the devices for progressively feeding the saw and carriage along, means for moving said worm and its shaft and said second wheel to bring said friction-wheels into contact and for thereafter manually applying thereto a graduated tension according to the work required of the saw.

4. In a metal-sawing machine, the combination with a saw, a carriage and a power-shaft, of devices connecting the power-shaft with the saw for continuously revolving the saw, a screw-shaft, a connection therefrom to the carriage whereby with the rotation of the screw-shaft the carriage is moved, a continuously-revoluble wheel on the power-shaft, a wheel similar to the aforesaid continuously-revoluble wheel and a series of devices coacting therewith and adapted to be operated thereby, and means whereby the two wheels may be brought into contact to actuate the latter series of devices or separated and which devices are also adapted to be engaged with the device movable on the screw-shaft for connecting the same with the screw-shaft to effect the forward movement of the saw and its carriage.

5. In a metal-sawing machine the combination with the power-shaft $d$, the shaft $g$ and the screw-shaft $i^2$, of a bevel-wheel $f$ and a belt-flange thereto on the shaft $g$, a bevel-pinion $f^2$ on the power-shaft $d$ meshing with the bevel-wheel $f$, a gear and belt-flange $o^2$, an arbor on which the same is mounted, an adjustable swinging support for said arbor, a belt 17 passing around the belt-flange of the bevel-wheel $f$ and around the belt-flange of the gear $o^2$, a sleeve $n$, gear $n^2$ and clutch-teeth $n'$ on the screw-shaft $i^2$, the gear $n^2$ and the gear $o^2$ being in mesh, and said parts continuously revoluble as a series with the movement of the power-shaft $d$, and a clutch device splined to the screw-shaft $i^2$ and adapted with its movement in one direction to engage the clutch-teeth $n'$ to revolve the screw-shaft $i^2$, substantially as set forth.

6. In a metal-sawing machine, the combination with the power-shaft $d$, the shaft $g$ and the screw-shaft $i^2$, of a bevel-wheel $f$ and a belt-flange thereto on the shaft $g$, a bevel-pinion $f^2$ on the power-shaft $d$ meshing with the bevel-wheel $f$, a gear and belt-flange $o^2$, an arbor on which the same is mounted, a stud-plate $o$ to which the said arbor is connected and supported, said stud-plate mounted and adapted to swing on the screw-shaft $i^2$ and lying against the frame of the machine, and bolts 18 for securing the said stud-plate in position when the proper tension is applied to the belt 17 by its movement, a belt 17 passing around the belt-flange of the bevel-wheel $f$ and around the belt-flange of the gear $o^2$, a sleeve $n$, gear $n^2$ and clutch-teeth $n'$ on the screw-shaft $i^2$, the gear $n^2$ and the gear $o^2$ being in mesh and said parts continuously revoluble as a series with the revolution of the power-shaft $d$, and a clutch device splined to the screw-shaft $i^2$ and adapted with its movement in one direction to engage the clutch-teeth $n'$ to revolve the screw-shaft $i^2$, substantially as set forth.

7. In a metal-sawing machine, the combination with the power-shaft $d$ and a friction-wheel $k$ on one end of the same and which is continuously revoluble therewith, of a similar friction-wheel $k'$, a shaft $l$ therefor and a worm $l'$ thereon, a screw-shaft $i^2$ adapted in its rotation to move the saw and carriage along in either direction, a worm-wheel $l^2$ loose upon the screw-shaft and meshing with the aforesaid worm $l'$, a clutch connection between the shaft $i^2$ and the wheel $l^2$, a movable support having bearings for the shaft $l$, a lever, a shaft upon which said lever is mounted, cranks upon said shaft, a pivotally-mounted device acting upon the movable support of the shaft $l$, a yielding connection between the same and the aforesaid crank device, and means for applying a graduated tension to the devices in proportion to the pressure required at the surfaces of the friction-wheels $k$, $k'$.

8. In a metal-sawing machine, the combination with the power-shaft $d$ and a friction-wheel $k$ on one end of the same and which is continuously revoluble therewith, of a similar friction-wheel $k'$, a shaft $l$ therefor and a worm $l'$ thereon, a screw-shaft $i^2$ adapted in its rotation to move the saw and carriage along in either direction, a worm-wheel $l^2$ loose upon the screw-shaft and meshing with the aforesaid worm $l'$, a clutch connection between the shaft $i^2$ and the wheel $l^2$, a sleeve $r$ and housing $r'$, the housing $r'$ having side prolongations forming bearings for the shaft $l$ near its respective ends whereby the shaft and the wheel $k'$ carried thereby are movable with the housing, the housing $r'$ covering the worm-wheel $l^2$, a standard 11 with guides providing for the longitudinal movement of the sleeve and housing, a pin 26 passing through the lower portion of the housing, a shaft $t$, a yoke-rocker $t'$ mounted on said shaft and having an upper end coming at either side of the pin 26, a lever $s'$, a shaft $s^2$ on which the same is mounted, a crank device mounted on the shaft $s^2$, a pin 27 having a head at one end pivotally connected to the crank device and at its other end passing through the lower end of the yoke-rocker, a spring 28 around the shaft 27 and between the head thereof, the movement of the lever $s'$ swinging the crank device, the yoke-rocker and moving the sleeve, the housing, the worm-wheel, the shaft $l$ and the friction-wheel $l'$ longitudinally of the screw-shaft $i^2$ so as to bring the friction-wheels $k$ $k'$ into forceful contact and engagement.

9. In a metal-sawing machine, the combination with the power-shaft $d$ and a friction-wheel $k$ on one end of the same and which is continuously revoluble therewith, of a similar friction-wheel $k'$, a shaft $l$ therefor, and a worm $l'$ thereon, a screw-shaft $i^2$ adapted in its rotation to move the saw and carriage along in either direction, a worm-wheel $l^2$ loose upon the screw-shaft and meshing with the aforesaid worm $l'$, a clutch connection between the shaft $i^2$ and the wheel $l^2$, a sleeve $r$ and housing $r'$, the housing $r'$ having side prolongations forming bearings for the shaft $l$ near its respective ends whereby the shaft and the wheel $k'$ carried thereby are movable with the housing, the housing $r'$ covering the worm-wheel $l^2$, a standard 11 with guides providing for the longitudinal movement of the sleeve and housing, a pin 26 passing through the lower portion of the housing, a shaft $t$, a yoke-rocker $t'$ mounted on said shaft and having an upper end coming at either side of the pin 26, a lever $s'$, a shaft $s^2$ on which the same is mounted, a crank device mounted on the shaft $s^2$, a pin 27 having a head at one end pivotally connected to the crank device and at its other end passing through the lower end of the yoke-rocker, a spring 28 around the shaft 27 and between the head thereof and the yoke-rocker, the movement of the lever $s'$ swinging the crank device, the yoke-rocker and moving the sleeve, the housing, the worm-wheel, the shaft $l$ and the friction-wheel $l'$ longitudinally of the screw-shaft $i^2$ so as to bring the friction-wheels $k$, $k'$ into forceful contact and engagement, the further movement of the lever $s'$ serving to compress the spring 28 and increase the pressure of contact between the friction-wheels, and means for holding said parts at the desired point under tension.

10. In a metal-sawing machine, the combination with the power-shaft $d$ and a friction-wheel $k$ on one end of the same and which is continuously revoluble therewith, of a similar friction-wheel $k'$, a shaft $l$, therefor, and a worm $l'$ thereon, a screw-shaft $i^2$ adapted in its rotation to move the saw and carriage along in either direction, a worm-wheel $l^2$ loose upon the screw-shaft and meshing with the aforesaid worm $l'$, a clutch connection between the shaft $i^2$ and the wheel $l^2$, a sleeve $r$ and housing $r'$, the housing $r'$ having side prolongations forming bearings for the shaft $l$ near its respective ends whereby the shaft and the wheel $k'$ carried thereby are movable with the housing, the housing $r'$ covering the worm-wheel $l^2$, a standard 11 with guides providing for the longitudinal movement of the sleeve and housing, a pin 26 passing through the lower portion of the housing, a shaft $t$, a yoke-rocker $t'$ mounted on said shaft and having an upper end coming at either side of the pin 26, a lever $s'$, a shaft $s^2$ on which the same is mounted, a crank device mounted on the shaft $s^2$, a pin 27 having a head at one end pivotally connected to the crank device and at its other end passing through the lower end of the yoke-rocker, a spring 28 around the shaft 27 and between the head thereof and the yoke-rocker, the movement of the lever $s'$ swinging the crank device, the yoke-rocker and moving the sleeve, the housing, the worm-wheel, the shaft $l$ and the friction-wheel $l'$ longitudinally of the screw-shaft $i^2$ so as to bring the friction-wheels, $k$, $k'$ into forceful contact and engagement, the further movement of the lever $s'$ serving to compress the spring 28 and increase the pressure of contact between the friction-wheels, a toothed sector $s$ secured to the standard 11 and having a part through which the shaft of the lever $s'$ passes, a pawl connected to the lever and adapted to engage the teeth of the sector, and a hand-latch 31 by which the pawl is moved and its hold released and the parts permitted to return to an initial position.

11. In a metal-sawing machine, the combination with a power-shaft and continuously-revoluble friction-wheel thereon, a carriage and saw and a screw-shaft $i^2$, of a clutch device splined to the shaft $i^2$ and a lever for moving the same longitudinally of the shaft, collars on the shaft for limiting the movement of the clutch device, a sleeve $n$, clutch-teeth $n'$ and a gear $n^2$ as an integral structure loosely mounted on the shaft $i^2$ coming against one of the aforesaid collars and between the same and a further collar secured to said shaft, a series of devices continuously actuated by the revolution of the power-shaft for continuously revolving the sleeve $n$ and the parts formed therewith, a worm-wheel loosely mounted on the said shaft $i^2$ at the other side of the clutch device having clutch-teeth adapted to engage the clutch device, a series of devices associated with the said worm-wheel and manually operated for transmitting the revolution of the said friction-wheel thereto when in contact, and which devices when engaged by the clutch device effect the rotation of the shaft in one direction, while the first-named series of revoluble devices effect the rotation of the screw-shaft in the opposite direction.

12. In a metal-sawing machine, the combination with a power-shaft and continuously-revoluble friction-wheel thereon, a carriage and saw and a screw-shaft $i^2$, of a clutch device splined to the shaft $i^2$ and a lever for moving the same longitudinally of the shaft, collars on the shaft for limiting the movement of the clutch device, a sleeve $n$, clutch-teeth $n'$ and a gear $n^2$ as an integral structure loosely mounted on the shaft $i^2$ coming against one of the aforesaid collars and between the same and a further collar secured to said shaft, a series of devices continuously actuated by the revolution of the power-shaft for continuously revolving the sleeve $n$ and the parts formed therewith, a worm-wheel loosely mounted on the said shaft $i^2$ at the other side of the clutch device having clutch-teeth adapted to engage the clutch device, a series of devices associated with the said worm-wheel and manually operated for transmitting the revolution of the said friction-wheel thereto when in contact, and which devices when engaged by the clutch device effect the rotation of the shaft in one direction, while the first-named series of revoluble devices effect the rotation of the screw-shaft in the opposite direction, and a series of coacting devices for moving the worm-wheel and the devices associated therewith longitudinally of the screw-shaft and also for applying a graduated tension, substantially as set forth.

13. In a metal-sawing machine, the combination with a power-shaft, a friction-wheel $k$ on one end thereof, a carriage and saw and a screw-shaft $i^2$, of a friction-wheel $k'$ normally closely adjacent to but not in actual contact with the friction-wheel $k$, a shaft therefor parallel with the power-shaft, movable bearings in which the shaft is mounted, a worm on the shaft and a worm-wheel loose on the screw-shaft $i^2$ meshing therewith, a clutch device for coupling the worm-wheel to the shaft, and manually-operated devices adapted for moving the friction-wheel $k'$, its shaft and support parallel with the screw-shaft for bringing the friction-wheels $k$, $k'$ into contact to turn the screw-shaft in one direction and move the carriage and saw.

14. In a metal-sawing machine, the combination with a power-shaft $d$, a friction-wheel $k$ on one end thereof, a carriage and saw and a screw-shaft $i^2$, of a friction-wheel $k'$ normally closely adjacent to but not in actual contact with the friction-wheel $k$, a shaft therefor parallel with the power-shaft, movable bearings in which the shaft is mounted, a worm on the shaft and a worm-wheel loose on the screw-shaft $i^2$ meshing therewith, a clutch device for coupling the worm-wheel to the shaft, manually-operated devices adapted for moving the friction-wheel $k'$, its shaft and support parallel with the screw-shaft for bringing the friction-wheels $k, k'$ into contact to turn the screw-shaft in one direction and move the carriage and saw, and other devices associated with the aforesaid manually-operated devices, and an intervening spring to which said devices apply a regulatable tension for increasing the pressure between the surfaces of the friction-wheels according to the effort required of the saw.

Signed by me this 23d day of March, 1904.

CHAS. A. JUENGST.

Witnesses:
  AUDLEY W. REYNOLDS,
  PERCY M. HOWCOTH.